(12) United States Patent
Maisotsenko et al.

(10) Patent No.: US 8,613,839 B2
(45) Date of Patent: Dec. 24, 2013

(54) WATER DISTILLATION METHOD AND APPARATUS

(75) Inventors: Valeriy Maisotsenko, Aurora, CO (US); Leland E. Gillan, Denver, CO (US); Alan D Gillan, Denver, CO (US); Rick J. Gillan, Golden, CO (US)

(73) Assignee: Idalex Technologies, Denver, CO (US)

( * ) Notice: Subject to any disclaimer, the term of this patent is extended or adjusted under 35 U.S.C. 154(b) by 319 days.

(21) Appl. No.: 12/880,835

(22) Filed: Sep. 13, 2010

(65) Prior Publication Data

US 2011/0108406 A1      May 12, 2011

Related U.S. Application Data

(60) Provisional application No. 61/251,104, filed on Oct. 13, 2009.

(51) Int. Cl.
*B01D 3/00* (2006.01)

(52) U.S. Cl.
USPC ............ 202/185.1; 202/182; 202/185.2; 202/185.3; 203/10

(58) Field of Classification Search
USPC .............. 203/10; 202/172, 180, 182, 185.1, 202/185.2, 185.3
See application file for complete search history.

(56) References Cited

U.S. PATENT DOCUMENTS

| | | | |
|---|---|---|---|
| 4,197,713 A | 4/1980 | Bulang | |
| 4,219,341 A | 8/1980 | Hussmann | |
| 4,350,570 A * | 9/1982 | Maisotsenko et al. | .......... 203/10 |
| 4,402,793 A | 9/1983 | Petrek | |
| 5,453,223 A | 9/1995 | Maisotsenko | |
| 5,520,008 A | 5/1996 | Ophir et al. | |
| 6,336,957 B1 | 1/2002 | Tsymerman | |
| 6,367,268 B1 | 4/2002 | Paul | |
| 6,378,329 B1 | 4/2002 | Paul | |
| 6,413,298 B1 | 7/2002 | Wnek et al. | |
| 6,484,527 B1 | 11/2002 | Paul | |
| 6,497,107 B2 | 12/2002 | Maisotsenko et al. | |
| 6,511,525 B2 | 1/2003 | Spletzer et al. | |
| 6,581,402 B2 * | 6/2003 | Maisotsenko et al. | .......... 62/315 |
| 6,592,338 B2 | 7/2003 | Zebuhr | |
| 6,689,251 B2 | 2/2004 | Zebuhr | |
| 6,705,096 B2 * | 3/2004 | Maisotsenko et al. | .......... 62/121 |

(Continued)

FOREIGN PATENT DOCUMENTS

FR      1162054      9/1958

OTHER PUBLICATIONS

Beckman, Carrier-Gas Enhanced Atmospheric Pressure Desalination, U.S. Department of the Interior, Oct. 2002.

*Primary Examiner* — Nina Bhat
(74) *Attorney, Agent, or Firm* — Jennifer L. Bales; Macheledt Bales LLP

(57) ABSTRACT

Apparatus for distilling a fluid such as water includes a vessel and heat transfer plates within the vessel structures to form at least one each cooling channel, evaporative channel, and condensing channel. Air enters the vessel and passes through the cooling channel, where it is cooled due to evaporation taking place in an adjacent evaporative channel. In the evaporative channel, input fluid is supplied to the walls of the heat transfer plates facing into the evaporative channel and evaporation forms vapor. The vapor is condensed in a condensing channel. In some versions of the apparatus, an evaporation channel forms a vacuum chamber and a condensing channel forms a compression chamber.

19 Claims, 12 Drawing Sheets

(56) References Cited

U.S. PATENT DOCUMENTS

| | | |
|---|---|---|
| 6,776,001 B2 | 8/2004 | Maisotsenko et al. |
| 6,779,351 B2 | 8/2004 | Maisotsenko et al. |
| 7,197,887 B2 | 4/2007 | Maisotsenko et al. |
| 7,228,699 B2 | 6/2007 | Gillan et al. |
| 7,431,805 B2 * | 10/2008 | Beckman .......................... 203/2 |
| 2006/0272933 A1 * | 12/2006 | Domen et al. ................... 203/10 |
| 2008/0277262 A1 | 11/2008 | Harris |

* cited by examiner

WATER DISTILLATION METHOD AND APPARATUS

FIELD OF THE INVENTION

The present invention relates to water treatment, and more particularly to methods and apparatus for distillation or desalination of fluids such as water.

BACKGROUND ART

Distillation is a common method for generating potable water from otherwise unsafe water sources (such as seawater or polluted ground water). With distillation, water is heated to boiling, and the resultant vapor is collected and condensed, producing distilled water.

Known in the art is a method of distillation or desalination of water wherein water is evaporated from an aqueous salt solution when the solution comes into contact with air and distilled water is subsequently retrieved from the thus moistened air by condensation (cf. V. N. Slesarenko "Modern Techniques for Desalination of Sea and Saline Waters" published in 1973 by the Energia Publishers, Moscow, pp., 47-48). However, in this method, a large amount of costly high-calorie heat energy is required to conduct the process (around 600 kcal/kg under atmospheric pressure, which corresponds to approximately 695 watts per 1 kg of desalinated water).

Conventional small distillers typically incorporate an electric heating element to boil water in a tank. A condensing coil mounted above the tank collects the vapor and condenses it. The distilled water is then transferred to a holding tank or cell. These boiler-type distillers, however, require substantial amounts of electrical power to produce relatively little distilled water and are thus highly inefficient. They are also extremely slow, often taking many hours to produce just a few gallons of distilled water. Accordingly, this sort of distiller has not gained widespread acceptance or use.

In addition to boiler-type distillers, thin-film distillers have also been proposed. For example, U.S. Pat. No. 4,402,793 describes a solar-powered, thin film distiller. It contains a plurality of parallel, spaced-apart plates, which are arranged to face the sun. Water to be distilled is supplied to the tops of the plates and guided to flow down the back face of each plate. Sunlight irradiates and heats the plates, causing a portion of the flowing water to evaporate. Vapor condenses along the front side of an adjacent plate, transferring heat to the flow of water on its opposite side and so on. Condensate generated along the front sides of the plates is separately collected at the bottoms of the plates. Although this distiller provides some advantages because it uses solar energy instead electricity, its design is very complicated and efficiency of distillation is small.

French Pat. No 1,162,054 discloses a distillation process in which liquid to be distilled is passed into a zone where energy is added thereto and then discharged from that zone in the form of a thin film, which is then contacted with a current of distilling vapor that is passed across the surface of the film. The big disadvantage of these patents is significant expenses of the energy.

Many types of evaporators have been used to produce fresh water by distillation. But in the past, the prior art types of evaporators have proved costly and troublesome when used continuously on a large scale. At temperatures over 160° F., seawater and many brackish waters deposit scale (incrustation of insoluble chemical compounds, especially calcium and magnesium), which interfere with the operation of the evaporator. Hot seawater is exceedingly corrosive. Most prior art methods of obtaining fresh water from seawater have been most inefficient. Modern desalination processes try to avoid the inefficient operations of the prior art by using of low temperature desalination for removing fresh water from seawater.

In another known process for recovering water from the atmosphere (see U.S. Pat. No. 4,197,713 and No. 4,219,341) the water vapor contained in the atmosphere is condensed on plastic sheets cooled by nightly radiation and the drops of water formed are collected. The yield of this process is very low.

An innovative heat tower process referred to as "Dewvaporation" has been investigated and is now operational at Arizona State University. The Dewvaporation technique uses a carrier-gas to evaporate water from saline feeds and dew-form pure condensate at a constant atmospheric pressure. The heat released by dewfall condensation on opposite sides of heat transfer walls supplies the heat needed for evaporation. Since only a small amount of external heat is needed to establish temperature differences across the wall and since the temperature of the external heat is versatile, the external heat source can be from waste heat, from solar collectors or from fuel combustion. The unit is constructed out of thin water-wettable plastics and operated at pressure drops about 0.1 inches of water (see Beckman, J. R., Final Report, Innovative Atmospheric Pressure Desalination, No 52, US Department of Interior, Bureau of Reclamation, 1999). But productivity of this atmospheric pressure desalination is small because processes of humidification and dehumidification are not efficient.

Another method of the atmospheric pressure distillation or desalination of water has been proposed by Maisotsenko in U.S. Pat. No. 4,350,570. According to this method of distillation evaporation of water from the aqueous salt solution through contact with air is conducted by using a primary and a secondary airflow. The primary airflow is supplied to a cooling zone of a vessel, while the secondary airflow and the aqueous salt solution are delivered to an evaporation zone, wherein the secondary airflow is moistened by the water evaporating from the aqueous salt solution by virtue of the temperature difference. During the course of absorbing the moisture, the secondary airflow acts to cool the primary airflow passing through the cooling zone. The secondary airflow is obtained by withdrawing between 20 and 90 volume percent from the primary airflow, after it has passed through the cooling zone of a vessel. Condensation of the water vapor is effected by conveying the secondary air flow to a condenser. This system is still not as efficient as desired, and requires a divided vessel and condenser.

Evaporative cooling may be used to cool air or any fluid below its wet bulb temperature and up to its dew point temperature. This Maisotsenko Cycle is taught in various patents, including U.S. Pat. Nos. 5,453,223; 6,497,107; 6,705,096; 6,776,001; and 6,779,351 (all incorporated herein by reference).

British Pat. No 549,519 discloses a high vacuum distillation apparatus, which has highly polished vaporizing and condensing surfaces that are separated by a substantially unobstructed space.

Inventor William Zebuhr has developed the thin film vacuum distillation system (see U.S. Pat. Nos. 6,423,187 and 6,689,251) and rotary evaporator and condenser for use in a vapor compression distiller (see U.S. Pat. No. 6,261,419 and No. 6,592,338). The different applications, which are used the water vapor compression cycle for producing the chilled water, were protected by next U.S. Pat. No. 2,096,147 "Refrigeration", U.S. Pat. No. 2,129,098 "Steam Jet Refrigeration Apparatus", U.S. Pat. No. 3,563,049 "Aspirator and Circulating Cooling Apparatus", U.S. Pat. No. 3,695,208 "Food Storage Apparatus for Use in Water-Borne Vessels", U.S. Pat. No. 4,102,392 "Low Energy Consumption Air Conditioning System", U.S. Pat. No. 4,576,014 "Produce Vacuum Cooler with Improved Venting", U.S. Pat. No. 4,607,491 "Cooling Trap for Vacuum", U.S. Pat. No. 4,723,415 "Direct Water Evaporating Cooling System", U.S. Pat. No. 6,329,005 "Rapid Cooling of Sealed Package", U.S. Pat. No. 6,427,453 "Vapor-Compression Evaporative Air Conditioning Systems and Components", U.S. Pat. No. 6,484,527 "Method for Operation a Refrigerating System".

There are today some companies, which successfully exist on the market, which utilize the water vapor compression cycle for producing the distilled water (for example, Ovation Products Corporation, USA), chilled water for cooling plant (for example, LEGO Company, Denmark), binary ice (for example, Integral Energietechnik GmbH, Germany and I.D.E. Technologies Ltd., Israel) and etc.

The underlying principle of vapor compression distillers is that, when the pressure of a vapor is increased, its saturation temperature rises. In conventional vapor compression distillers, vapor produced in an evaporator (vacuum chamber) is removed, compressed and returned to the condenser, where it condenses, producing a distillate. A compressor is used to reduce the pressure within an evaporator to a sub-atmospheric level causing the evaporation of vapor from a solution, which acts to take the heat of vaporization from the solution, thereby reducing the water temperature. This chilled water can be used for different air conditioning and cooling systems. Vacuum-process technology producing chilled water needs no refrigerant of the conventional kind, but water from the process itself is used to generate cooling. Furthermore, the heat of vaporization that is emitted as the vapor condenses may be used to heat and thus evaporate the liquid being distilled.

But all existing vacuum-process technologies of the water vapor compression cycle for producing distilled water have essential disadvantages. First of all it is not efficient when the heat of condensation of water vapor is used as heat for evaporation. Usually the existing systems use air and water-cooling condensers (with or without cooling towers) and sometimes evaporative cooling condensers. Here the air or water being cooled cannot be cooled lower than the wet bulb temperature of outside air. Therefore pressures of condensation are high and this increases consumption of energy by the compressor and reduces the productivity of the water vapor compression cycle. In addition, all or part of the heat of condensation is lost to the atmosphere without recovery. The heat transfer rate in the condenser and evaporator is low.

Accordingly, it is desired to improve water distillation methods and apparatus.

SUMMARY OF THE INVENTION

This invention provides more efficient processes of distillation. The thermal energy required for evaporation is decreased significantly by recycling the heat of condensation of the distillate.

This invention also takes advantage of the low partial pressure of water in air to cause low temperature evaporation of water and then condensation of the water from the air. The method of this invention starts and returns airflow used to evaporate and condense the water with the same enthalpy level or total air energy level. The airflow used to do the work of evaporating and condensing may be exhausted or be used for additional cooling applications, as its temperature is below the temperature of the outside air entering the apparatus.

A vessel is formed generally having walls and at least two heat transfer plates, and forms at least one cooling channel, evaporative channel, and condensing channel. The heat transfer plates divide cooling, evaporative and condensing channels of the vessel. The plates form dry sides (having moisture proof layers) forming with the vessel walls the cooling channel and the condensing channel, and wet sides (having wicking layers) comprising the evaporative channel. In some embodiments, an evaporation channel forms a vacuum chamber and a condensing channel forms a compression chamber.

The input airflow is, for example, outside air. Airflow is first directed in to the cooling channel. In the cooling channel, the airflow is pre-cooled via contact with the dry side of the first plate, without changing its absolute humidity but reducing its temperature from ambient to substantially the dew point temperature of the input air. Part of the airflow is redirected through the plate, for example, via perforations, to the evaporative channel of the vessel, for direct contact with a solution covering a wick layer on the wet sides of the plates. In the evaporative channel, airflow becomes humidified with moisture evaporating from the solution. This process increases the temperature and the moisture content of the airflow.

Thereafter, part of the warm moist airflow from the evaporative channel is directed to the condensing channel, formed of the dry side of the second plate and a wall of the vessel. This airflow is cooled to substantially the dew point temperature of the airflow via contact with the dry side of the second plate. Moisture is condensed from airflow in the condensing channel in the form of distilled water.

There are many variations to fit the wide variety of applications of the distillation method. For example, the airflow can be assisted with a fan. The distilled water may be used to cool airflow before enters the condensing channel.

Usually there is more than one set of cooling, evaporative and condensing channels in a vessel. Evaporative channels may be located between cooling and condensing channels and there is generally a heat exchange mechanism between evaporative channels and cooling channels and also between evaporative channels and condensing channels.

Airflow may be heated or dehumidified before entering or while passing through the cooling channel of the vessel. Airflow and/or aqueous salt solution may be heated, for example, by solar radiation and/or geothermal power.

DETAILED DESCRIPTION OF THE INVENTION

Below is a table of reference numbers and elements used in the description below.

| | Reference Number Table |
|---|---|
| 1 | airflow |
| 2 | cooling channel |
| 3 | evaporative channel |
| 3' | second evaporative channel |
| 4 | first plate |
| 5 | dry side of first plate |
| 6 | wet side of first plate |
| 7 | second plate |
| 8 | dry side of second plate |
| 9 | wet side of second plate |
| 10 | condensing channel |
| 11 | solution |
| 12 | distilled water |
| 13 | fan |
| 14 | water purifying vessel |
| 15 | water cooler |
| 16 | product airflow |
| 17 | working airflow |
| 18 | wick layer |
| 20, 21 | openings for product air |
| 22 | openings for working air |
| 23 | opening in second plate |
| 24 | baffle - cooling/condensing |
| 25 | baffle - evaporation |
| 26 | distilled water pipeline |
| 27 | solution pipeline |
| 28 | recovery channels |
| 29 | fan |
| 30 | dual plate |
| 31 | dryportions of dual plate |
| 32 | wetportions of dual plate |
| 33 | solid dessicant |
| 34 | output channel |
| 35 | vacuum channel |
| 36 | compressor |
| 37 | vacuum channel plate |
| 38 | vacuum/condenser plate |
| 39 | condense/evaporate plate |
| 40 | liquid desiccant |
| 41 | heat transfer plate |
| 43 | pump - weak desiccant |
| 44 | pump - concentrated desiccant |
| 45 | added heat |
| 47 | solution supply tank |

| | Reference Number Table |
|---|---|
| 48 | solution supply pipe |
| 49 | solution discharge tank |
| 50 | solution discharge pipe |
| 51 | distilled water tank |
| 52 | distilled water pipe |
| 57 | vapor |
| 58 | cold product airflow |

Figure 1:
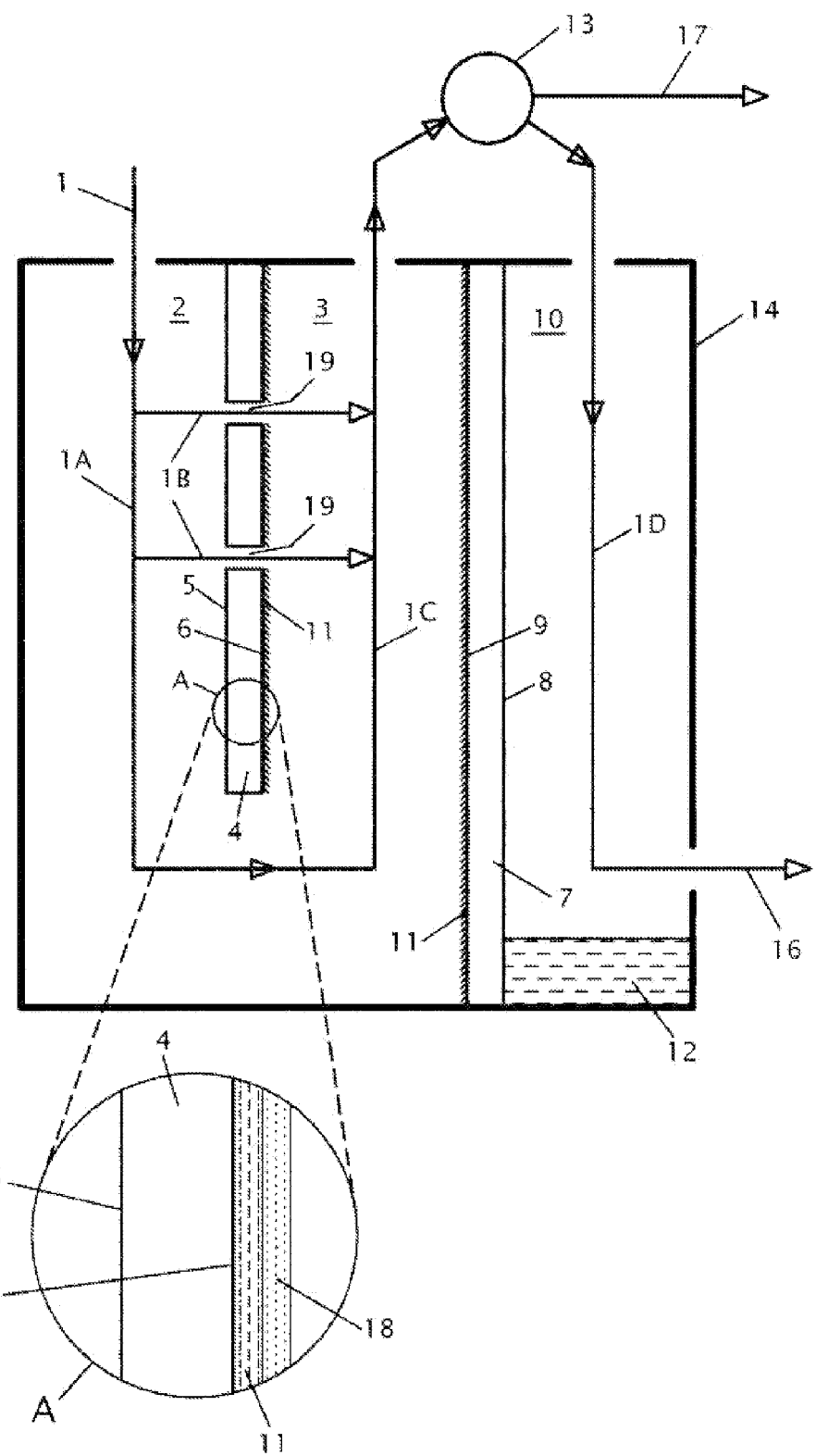
FIG. 1 is a schematic diagram showing an embodiment of a water distillation system in keeping with present invention.

FIG. 1 is a flow diagram showing a water purifying, or distilling, unit in keeping with present invention. A vessel 14 encloses two heat transfer plates 4 and 7. In FIG. 1, the left side wall of vessel 14 and the dry side 5 of first plate 4 form the cooling channel 2. The wet side 6 of the first plate 4 and the wet side 9 of the second plate 7 form the evaporation channel 3. The dry side 8 of the second plate 7 and the right side wall of vessel 14 form the condensing channel 10. Wet sides 6 and 9 of plates 4 and 7 are wetted by a solution 11 to be distilled (e.g. an aqueous salt solution) for example by spraying, wicking from a reservoir, or flowing solution 11.

Airflow 1, for example, outside air, is directed into cooling channel 2, becoming airflow 1A. As it passes through cooling channel 2 in contact with dry side 5 of the plate 4, airflow 1A is cooled, reducing its temperature from ambient to substantially the dew point temperature of outside airflow 1 without changing the absolute humidity of airflow 1A. Airflow 1A is cooled because dry side 5 of first plate 4 is in heat transfer relationship with wet side 6 of the first plate, and hence is cooled by the evaporation of solution 11 taking place on wet side 6.

A portion 1B of airflow 1A is redirected through perforations 19 in plate 4, from cooling channel 2 to evaporative channel 3. Airflow 1B thus comes into direct contact with solution 11, which forms a film in wick layers 18 of wet sides 6 and 9 of plates 4 and 7. The remainder of airflow 1A passes below plate 4 (in FIG. 1) into evaporative channel 3 to join airflow 1B in forming airflow 1C.

As airflow 1C passes through evaporative channel 3 it is heated and moistened, due to evaporation of solution 11 (absent impurities or salt in solution 11). At the end of evaporative channel 3, warm, damp airflow 1C is split by fan 13 into two parts. Part of the airflow is diverted from the system as working airflow 17, and the rest is directed by fan 13 to condensing channel 10, forming airflow 1D.

Passing through condensing channel 10 of vessel 14, the heated and moist airflow 1D is cooled to substantially the dew point temperature of outside air 1, via contact with dry side 8 of second plate 7. Dry side 8 is in heat transfer relationship with wet side 9 of second plate 7, and hence is cooled by the evaporation of solution 11 taking place on wet side 9. As airflow 1D is cooled by dry side 8, water condenses to form purified water 12.

Fan 13 is helpful in moving the airflow through the system, as it reduces evaporative temperature in evaporative channel 3 and simultaneously improves the process of condensation of moisture from airflow 1D in condensing channel 10. In this embodiment, fan 13 is installed between the outlet of airflow 1C from evaporative channel 3 and the inlet of airflow 1D to condensing channel 10.

Moisture impermeable layer materials are generally employed as the material for the dry sides 5 and 8 (moisture-proof layer) of plates 4 and 7. Suitable materials include thin plastic or polythene film, moisture repellent lacquers and paints, etc. Wick layers 18 on wet sides 6 and 9 of the plates 4 and 7 are formed of capillary porous plastics, highly porous paper or the like.

The moisture impermeable and wick layers may joined together by gluing, or by depositing a film of metal onto plastic, or alternatively, by making use of the cohesive molecular forces; application of lacquers and paints onto the surface of the wick or capillary porous materials may also be utilized for the same purpose.

Plates 4 and 7 may be formed of unitized one-material construction, such as of moisture impermeable plastic film one side of which is made capillary porous during its manufacture. Alternatively, it can be fabricated from a capillary porous plastic, one side of such plastic plate being subjected to thermal treatment tending to sinter the plastic and thereby close the pores, which makes the thus treated side of the capillary porous plastic impermeable to moisture. In general, plates 4 and 7 can be made of wick, plastic, metal materials or compositions of these materials.

It is sometimes expedient to preheat airflow 1A before entering or during its passage through cooling channel 2, for example, using exhaust heat or solar radiation. By raising the inlet temperature of airflow 1A, additional capacity of airflow 1C to hold water is realized, and therefore additional distilled water 12 is produced. Because of the very low vapor pressure of water in airflow 1A, small temperature increases of airflow 1A will make large difference in the amount of the distilled water 12. It is also sometimes worthwhile to dry airflow 1A before entering or during its passage through cooling channel 2. Similarly, it is also sometimes desirable to heat solution 11 entering or moving through the evaporative channel 3 to improve evaporation.

Figure 2:
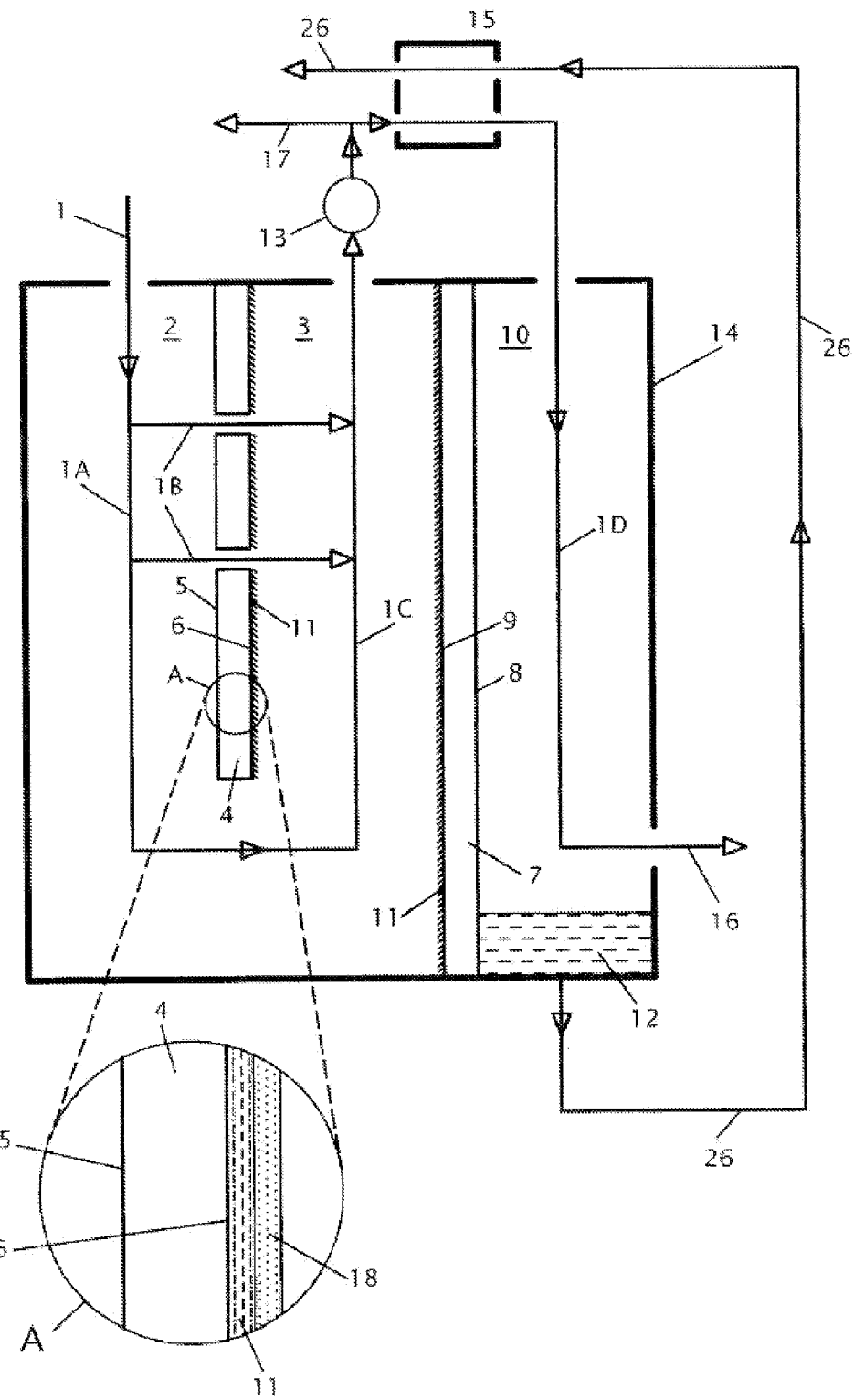
FIG. 2 is a schematic diagram showing a water distillation system similar to that of FIG. 1, but further including a water cooler and pipeline.

FIG. 2 is a diagram of an embodiment of the present invention including a water cooler 15 and distilled water pipeline 26. Because the temperature of the distilled water 12 collected in condensing channel 10 is always lower than the temperature of airflow 1C, after its passage through evaporative channel 3, distilled water 12 is used to cool airflow 1C before it enters condensing channel 10. Distilled water 12 is directed from its collection point in condensing channel 10 to water cooler 15, via water pipeline 26. Airflow 1C passes through water cooler 15 and is cooled before entering condensing channel 10 as airflow 1D. In the embodiment of FIG. 2, Fan 13 drives the flow of air through cooler 15, and also directs working airflow 17, which is not cooled.

Figure 3:
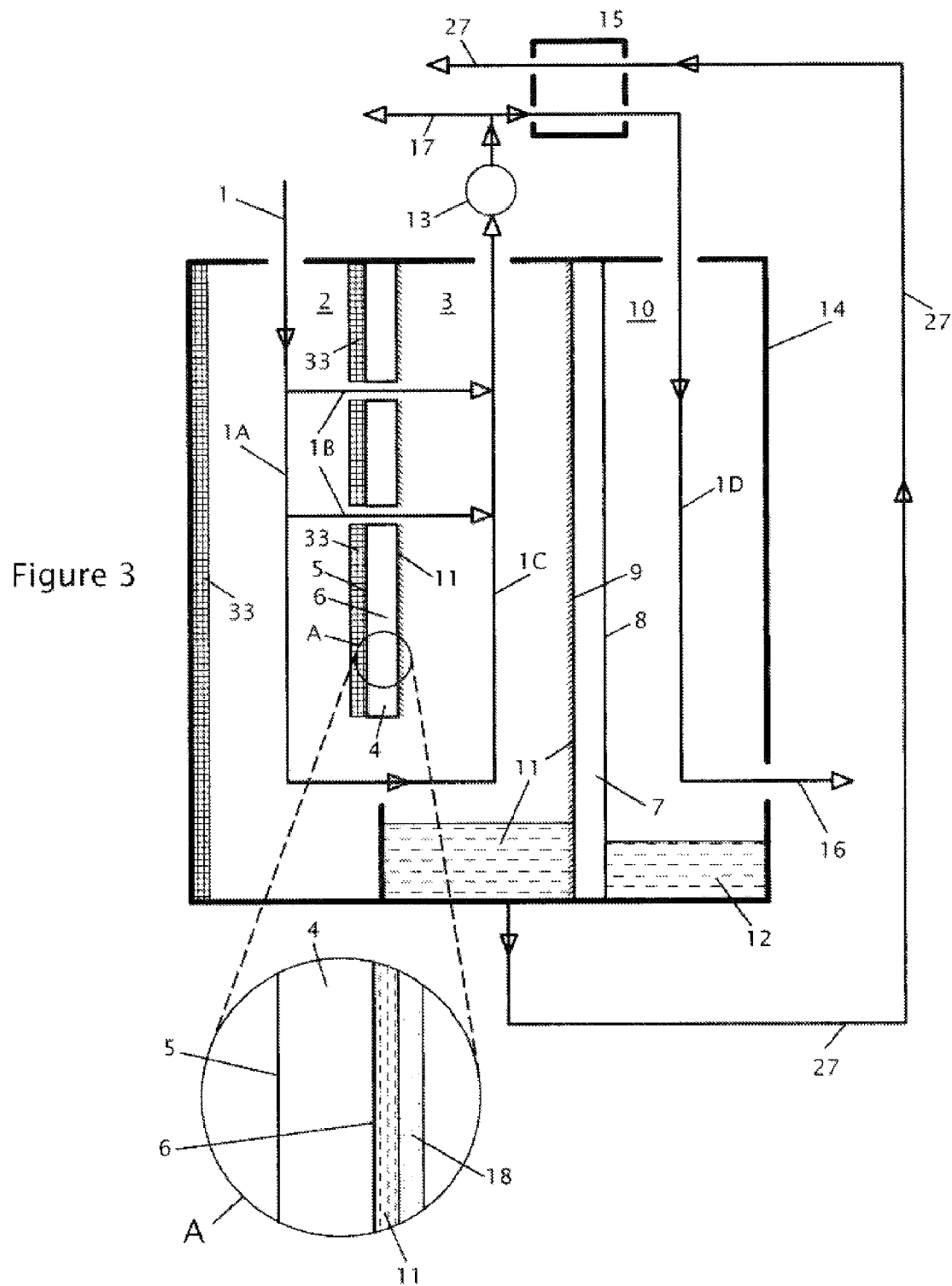
FIG. 3 is a schematic diagram showing a water distillation system similar to that of FIG. 2, but further including a water pipeline for the solution and a desiccant.

FIG. 3 illustrates an embodiment very similar to that of FIG. 2, but with the use of solution 11 rather than distilled water 12 to cool the airflow via water cooler 15 and with the addition of a solid desiccant 33. Solution 11 flows along wicking layers 18, and is collected in a reservoir in evaporation channel 3. The temperature of this reservoir of solution 11, after its passage along evaporative channel 3, is always lower than the temperature of airflow 1C, after its passage through evaporative channel 3. Thus solution 11 is directed to water cooler 15 via solution pipeline 27.

As an alternative, cold distilled water 12 and cold solution 11 could both be used to cool airflow 1C. The distilled water and the solution would be kept separate in such a system.

The embodiment of FIG. 3 also dries airflow 1A with a desiccant (liquid or solid) before or during its passage through cooling channel 2. This drying process reduces the absolute humidity (the moisture content) of airflow 1A and thus increases the latent heat potential capacity and enhances the evaporation from solution 11 in evaporative channel 3. As a result it is possible to get more product—distilled water 12—out of the system.

The cold and dry airflow 1A is passed from cooling channel 2 to evaporative channel 3 as airflow 1B, where it evaporates water vapor from solution 11, resulting in a lower temperature than the outside airflow 1 dew point temperature, because airflow 1B has less humidity than outside airflow 1. In addition, the heat of adsorption, which transfers from cooling channel 2 via plate 4 to evaporative channel 3, is increased due to the direct contact of fluids through plate 4.

The traditional drying process using a desiccant needs to use heat energy and a reactivation system for recovery of the desiccant. Another embodiment solves this problem without requiring these. In this embodiment, first plate 4 is capable of passing water vapor through it, from cooling channel 2 to evaporation channel 3. The interior surface of cooling channel 2 is made of or covered with solid desiccant material 33. Solid desiccant material 33 may be, for example, silica gel, lithium chloride, etc.

In this case an internal desiccant regeneration process is accomplished as the absorbed moisture is transported from cooling channel 2 to evaporative channel 3 through first plate 4, for example because the pressure in evaporative channel 3 is less than the pressure in the cooling channel 2. In addition, the heat flux from dry side 5 of plate 4 to solution 11 helps pull the water from desiccant material 33 through plate 4 to evaporative channel 3. Pressurizing cooling channel 2 and/or pulling a partial vacuum in evaporative channel 3 may be accomplished with the insertion of a baffle (not shown) between cooling channel 2 and evaporative channel 3.

In this embodiment, plate 4 is made of wick material, plastic, metal or solid desiccant materials or compositions of these materials, such that the physical capability of heat transfer is less along the surface of the plate or membrane as compared to the heat transfer rate across the thickness of the plate between the adjacent channels. The plate has some capacity for transferring vapor or liquid across its thickness, so a bias is created, by pressure or other means commonly known or developed in the future to bias this transfer from cooling channel 2 via plate 4 to evaporative channel 3.

Figure 4:
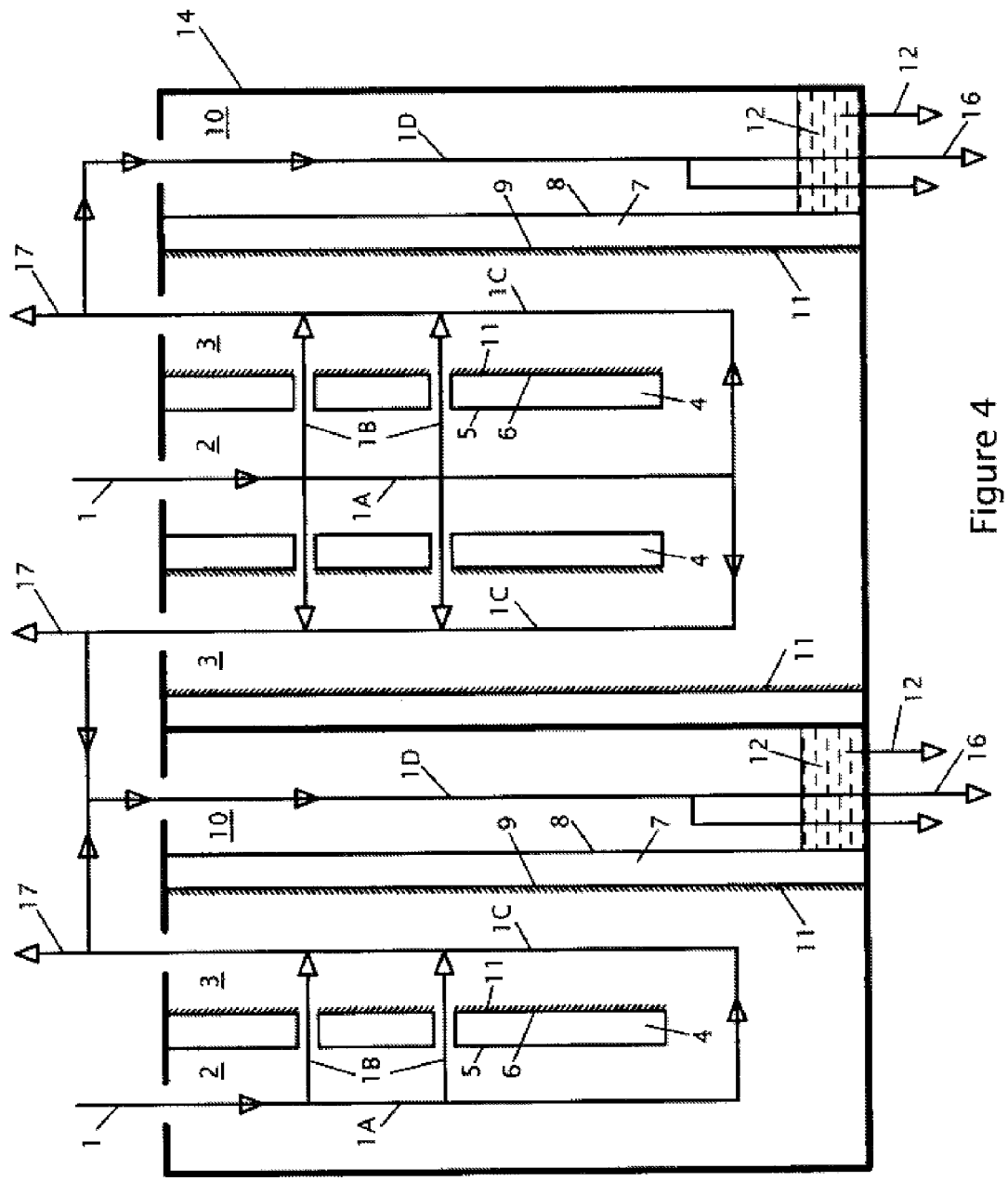
FIG. 4 is a schematic diagram showing a water distillation system similar to that of FIG. 1, but configured to include multiple cooling, evaporative, and condensing channels within the vessel.

FIG. 4 illustrates another embodiment of a water distilling system containing multiple sets of cooling channels 2, evaporative channels 3 and condensing channels 10. Most practical systems will utilize multiple sets of channels. Each evaporative channel 3 is located between a cooling channel 2 and a condensing channel 10. Heat is exchanged between evaporative channels 3 and cooling channels 2, and also between evaporative channels 3 and condensing channels 10. An extra evaporative channel 3 is possible in this configuration, because the right-hand cooling channel 2 feeds two evaporative channels 3. Note that product airflow 16 exits condensing channels 10 above purified water reservoirs 12 (out of the page in FIG. 4).

Figure 5:
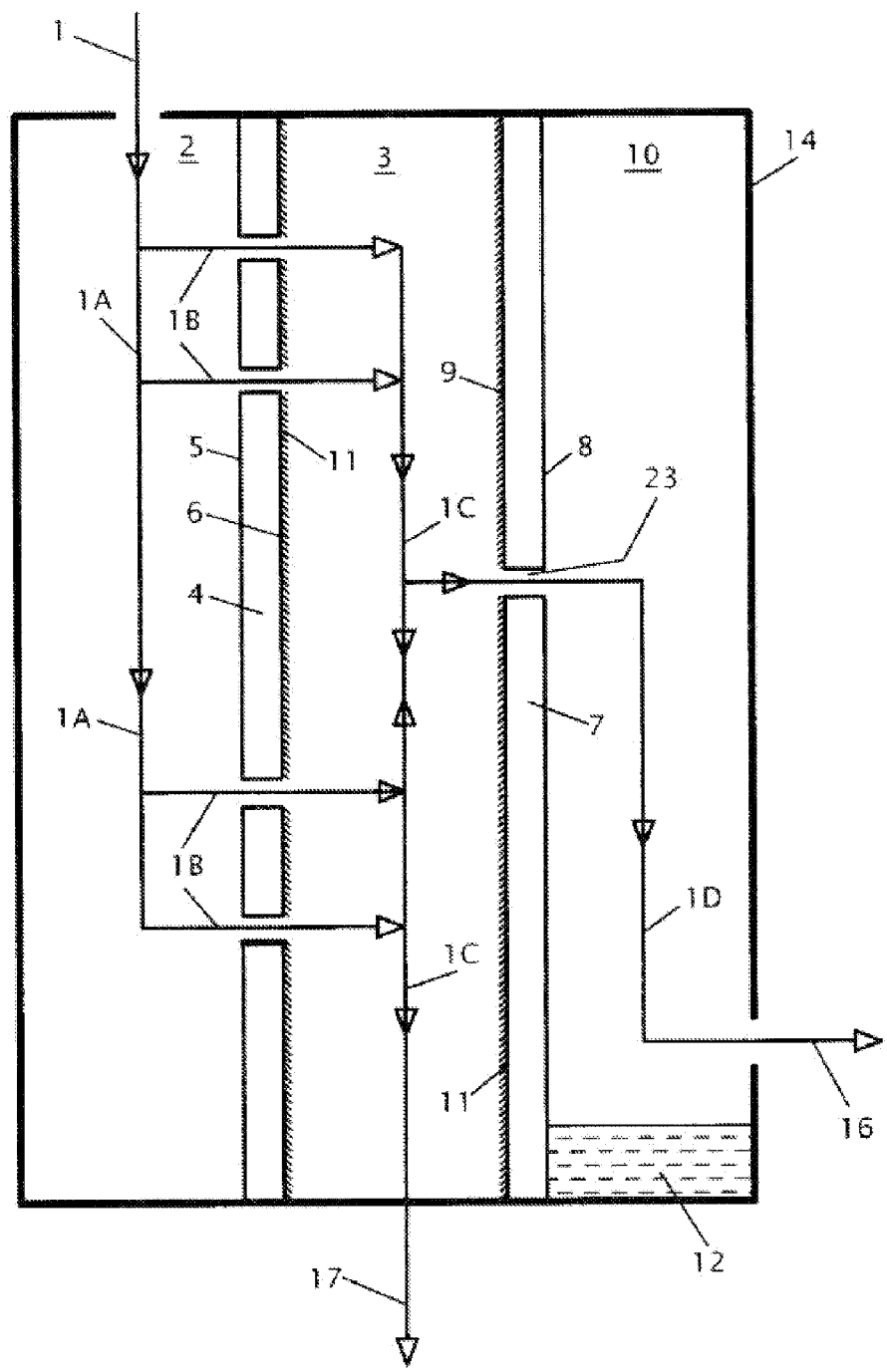
FIG. 5 is a schematic diagram showing a water distillation system similar to that of FIG. 1, but wherein the airflow passing through the cooling channel is divided into product airflow and working airflow.
Figure 6:
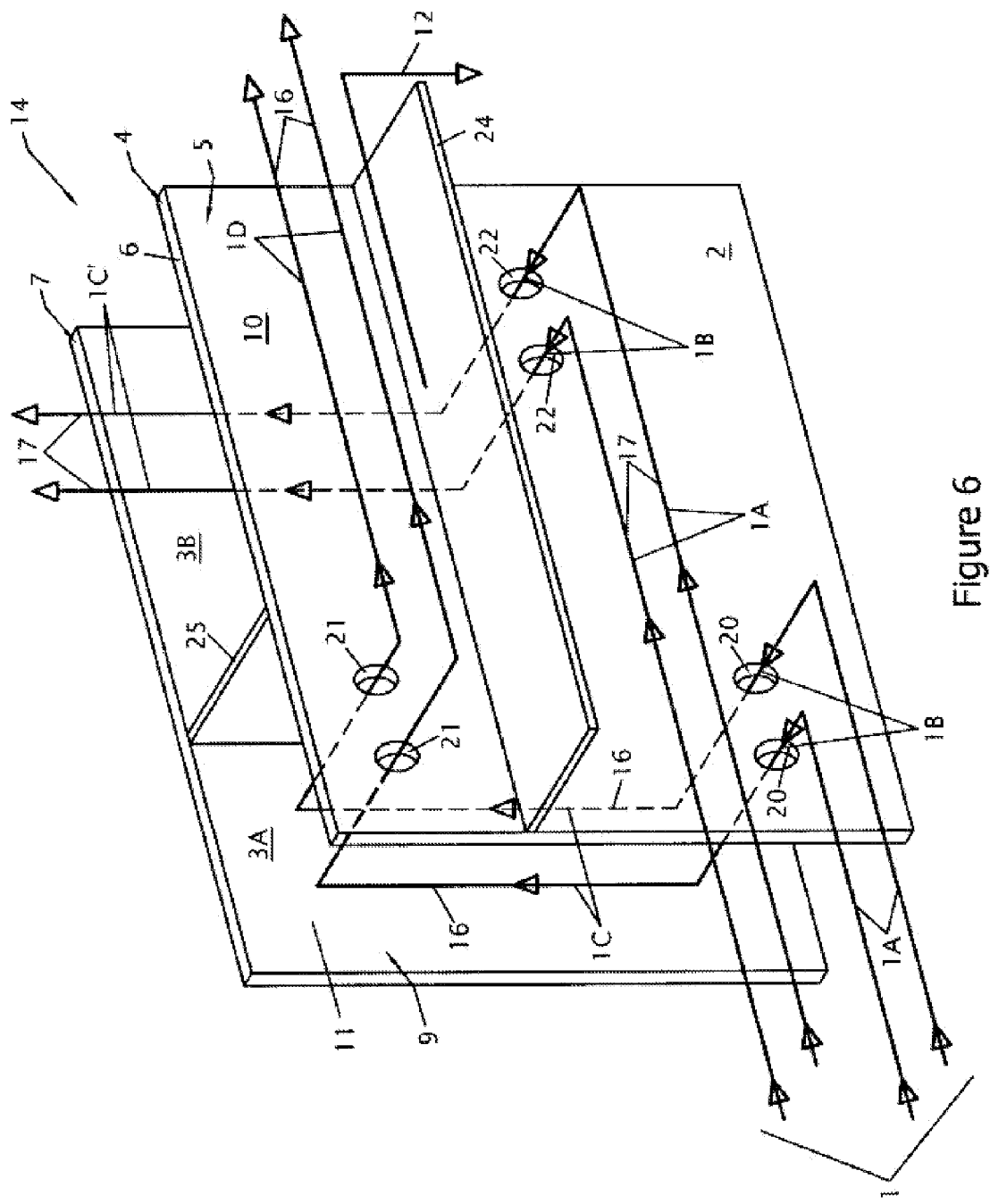
FIG. 6 is a cutaway perspective view of an exemplary structure for use in water distillation apparatus according to the invention.

FIGS. 1-4 illustrate a direction of movement of airflow 1A in cooling channels 2 and airflow 1D in condensing channels 10 that is in a counter flow direction to the movement of airflow 1C in evaporative channels 3. The channels generally must be parallel, however they can be in cross flow or some mix between cross and counter flow. For example, FIGS. 5 and 6 show cross flow directions between airflow 1A in cooling channels 2 and airflow 1C in evaporative channels 3 and between airflow 1A in cooling channels 2 and airflow 1D in condensing channels 10. From a strict thermodynamic standpoint counter flow is generally more efficient. However, some designs may more economical to fabricate and the geometry may be more convenient with the use of cross flow.

FIG. 5 shows an embodiment of a water distiller wherein a portion of airflow 1C is withdrawn from vessel 14 as working airflow 17. The remainder of airflow 1C passes through opening 23 in second plate 7 to condensing channel 10 as airflow 1D, and exit vessel 14 as product airflow 16. Product airflow 16 is predominantly withdrawn from the first part of cooling channel 2, although some air mixing occurs within evaporative channel 3. Working airflow 17 is predominantly drawn from the later part of cooling channel 2.

As in previous embodiments, airflow 1C is wetted in evaporative channel 3 via solution 11, resulting in cooling of cooling channel 2 and condensing channel 10. Working air 17 reaches substantially the dew point temperature and it causes condensation of water vapor from product air 16.

FIG. 6 is a cutaway perspective view showing an example of structure for implementing a water distiller according to the present invention. First plate 4 is constructed such that cooling channel 2 and condensing channel 10 are located on the same dry side 5 of plate 4. Channels 2 and 10 are divided by channel guides in the form of baffles, rods, corrugated sheets or the like (a baffle 24 is shown in FIG. 6).

Input airflow 1 (for example outside air) enters cooling channel 2 as flow 1A. A portion of this air (the product airflow) passes into cooling channel 3A via openings 20 to become flow 1C. Airflow 1C next passes through openings 21 into condensing channel 10 as airflow 1D, and water vapor is condensed into distilled water 12. This airflow 1D then exits vessel 14 as product airflow 16.

The rest of airflow 1A (the working airflow) passes through openings 22 into cooling channel 3B as airflow 1C'. It exits vessel 14 as working airflow 17.

Evaporative channels 3A and 3B are formed between plates 4 and 7 with a baffle 25 separating the two evaporative channels. Wet sides 6 and 9 of plates 4 and 7 respectively form the side walls of evaporative channels 3A, 3B.

Note that the structure of FIG. 6 may be housed in a vessel 14, or, another plate 7 may form the front wall of channels 2 and 10, as the distilling structure of FIG. 6 is repeated until a plurality of distilling channel sets are formed to operate in parallel.

Wicking structure, solution, fans, etc. are not shown in FIG. 6 for clarity. Those skilled in the art will appreciate that configurations similar to other embodiments shown and described herein may be used.

Figure 7:
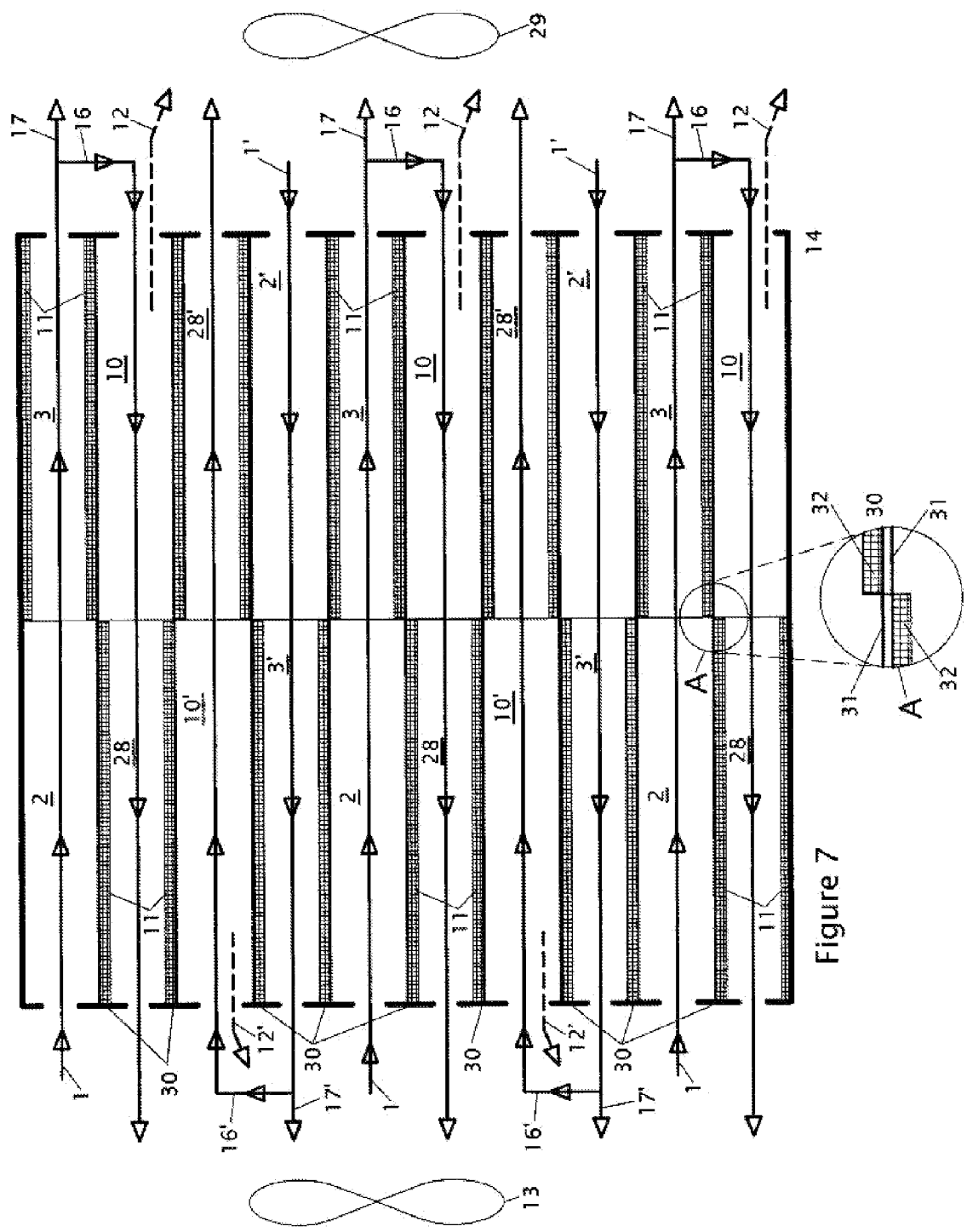
FIG. 7 is a schematic representation of an expanded assembly of multiple dual plates.

FIG. 7 is a schematic representation of an expanded assembly of multiple cooling 2 and 2', evaporative 3 and 3', condensing 10 and 10' and recovery 28 and 28' channels forming a water distilling apparatus according to the present invention. Fan 13 transports airflow 1 and fan 29 transports opposite airflow 1'.

Dual plates 30 are illustrated in section A. A dual plate 30 has (in the example shown in section A) a dry portion 31 on its left top side, a wet portion 32 on its right top side, a wet portion 32 on its left lower side and a dry portion 31 on its lower right side (the adjacent plates above and below this example plate are flipped so that wet sides face wet sides and dry sides face dry sides). Thus, a dry channel is followed by a wet channel or a wet channel is followed by a dry channel, without the airflow making a turn.

Airflow 1 is directed by fan 13 to cooling channels 2 and then is directed rectilinearly to evaporative channels 3. After passing through evaporative channels 3, a portion of heated and moist airflow (the working airflow 16) is drawn off and directed into condensing channels 10. The rest of the airflow exits vessel 14 as working airflow 17.

After passing through condensing channels 10, airflow 16 continues rectilinearly into recovery channels 28. Moisture 12, which is condensed from airflow 16 in condensing channels 10, is provided for customer use.

Similarly but reciprocally, airflow 1' is directed by a fan 29 into cooling channels 2' and hence into evaporative channels 3'. A portion of heated and moist airflow 16' is directed into condensing channels 10', and the rest becomes working airflow 17' and is removed. After passing through condensing channels 10' airflow 16' continues rectilinearly to recovery channel 28'. Moisture 12' condensed in condensing channels 10' is provided for customer use.

In the parallel structure shown in FIG. 7, recovery channels 28 (or 28') are located between cooling channels 2 (or 2') and condensing channels 10' (or 10) channels. Evaporative channels 3 (or 3') are located between the condensing channels 10 (or 10') and cooling channels 2' (or 2).

This advanced structure has several advantages. For example, recovery channels 28, 28' provide additional cooling of adjacent channels 2, 2', 10', and 10. Also the pressure drop for airflow 1 in this scheme less than in above-described embodiments, because the airflow path is more direct and requires fewer turns. In this configuration two fans 13 and 29 are advisable.

Recovery channels 28, 28' may be wetted by solution 11, using any prior art method, in addition to evaporative channels 3, 3'. This allows for additional rejection of heat from cooling channels 2, 2' and condensing channels 10', 10.

The above-described water distillation embodiments are most efficient in arid and middle regions where dew points are relatively low temperatures and where the humidity ratio (pounds moisture per pound dry air) does not exceed about 0.015. In other areas of the world, where humidity ratios exceed 0.015, other embodiments, based on vapor compression distillers, are often more efficient. The embodiments of FIG. 8-11 use this sort of structure.

The underlying principle of vapor compression distillers is that, by raising the pressure of a vapor, its saturation temperature also rises. In conventional vapor compression distillers, vapor produced in an evaporator (vacuum chamber) is removed, compressed and returned to the condenser (compression chamber), where it condenses, producing a distillate. A compressor is used to reduce the pressure within an evaporator to a sub-atmospheric level causing the evaporation of vapor from a solution, which acts to take the heat of vaporization from the solution, thereby reducing the water temperature. Vacuum-process technology for producing chilled water needs no refrigerant of the conventional kind, but water from the process itself is used to generate cooling. Furthermore, the heat of vaporization that is emitted as the vapor condenses may be used to heat and thus evaporate the liquid being distilled.

The same water vapor compression cycle, which comprises a compressor, evaporator and condenser, can be adapted for producing distilled water. Heat is provided to an evaporator and rejected from a condenser. Generally all non-condensable gases are removed from the water vapor, using a vacuum pump (not shown), before it enters the condenser.

The present invention improves on conventional vacuum process technology. The thermal energy required for evaporation is decreased significantly by recycling the heat of condensation of the distillate.

Figure 8:
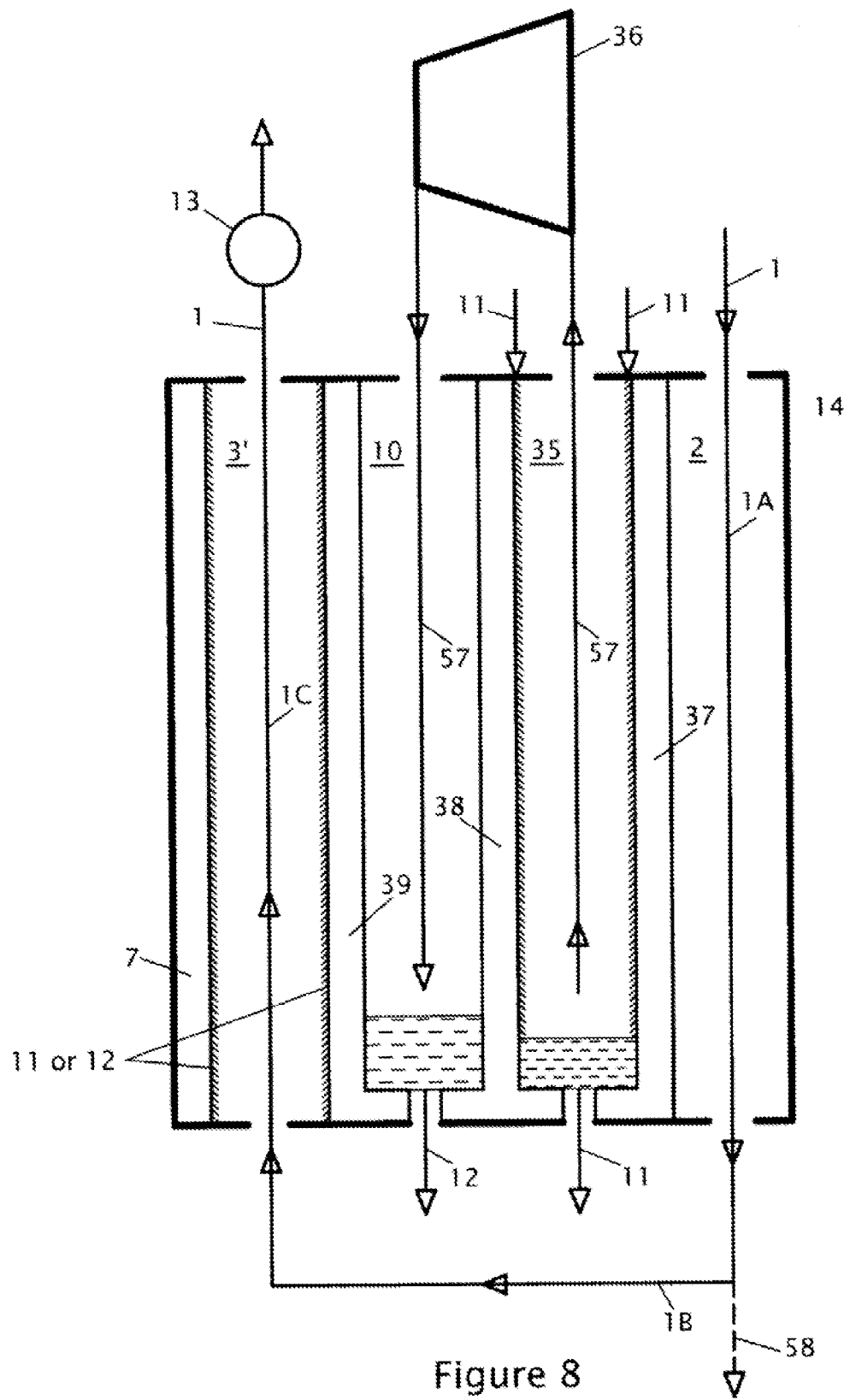
FIG. 8 is a schematic diagram showing a water distillation system in keeping with the embodiment of FIG. 1, but including a vacuum channel adjacent and connected via a compressor with the condensing channel.

FIG. 8 is a flow diagram illustrating a water distillation method similar to embodiment of FIG. 1, but with a vacuum channel 35 forming the evaporative channel and a compressor 36. Vacuum evaporative channel 35 is placed between condensing channel 10 and cooling channel 2. Hence, heat is transferred into vacuum channel 35 via plate 37 from cooling channel 2 and via plate 38 from condensing channel 10. This assists evaporation of solution 11 within vacuum channel 35, which forms vapor 57. Compressor 36 removes vapor 57 from vacuum channel 35 and directs it into condensing channel 10. Evaporative channel 3' provides cooling to condensing channel 10, to condense vapor which will result in the distilled output fluid.

Airflow 1 is directed into cooling channel 2 forming airflow 1A. Passing through a cooling channel 2 in contact with the dry side of the plate 37, airflow 1A is cooled, reducing its temperature from ambient to substantially the temperature of water vapor 57 in vacuum channel 35, as well as reducing its absolute humidity. Airflow 1B is redirected from cooling channel 2 into evaporative channel 3' as airflow 1C. Airflow 1C contacts a liquid (solution 11 or distilled water 12), which, as a film, is contained in a wick layer on the wet sides of the plates 39. As airflow 1C passes along evaporative channel 3' it evaporates the liquid and becomes heated and moistened. Fan 13 removes the warm wet airflow 1C from vessel 14 and directs it, for example, outside as waste.

As airflow 1A passes through cooling channel 2, heat is transferred from airflow 1A into vacuum channel 35 via plate 37. This heat helps to evaporate vapor 57 from solution 11 (or distilled water 12) inside vacuum channel 35. Compressor 36 removes and compresses this vapor 57 and directs it to condensing channel 10, where vapor 57 condenses, and producing distilled water 12. The heat of condensation of vapor 57 is rejected from condensing channel 10 via plate 39 into evaporative channel 3' and warms airflow 1C, which is passing along the wet sides of plates 39. Simultaneously the heat of condensation of vapor 57 is rejected from the condensing channel 10 via plate 38 into vacuum channel 35. This double cooling process for condensing channel 10 increases efficiency of condensation process Compressor 36 is used to reduce the pressure within vacuum channel 35 to a sub-atmospheric level, causing the evaporation of vapor 57 from solution 11, and reducing the temperature of solution 11.

Because airflow 1C inside evaporative channel 3' is in heat exchange relation with condensing channel 10, moisture is condensed from vapor 57 in condensing channel 10 in the form of distilled water 12, which is provided for the customer.

As a feature, a portion of airflow 1A, after passing through cooling channel 2, may be withdrawn from vessel 14 and provided as cold air 58 for use by a customer. As an alternative, cooling channel 2 may be moved to the other side of vessel 14.

Figure 9:
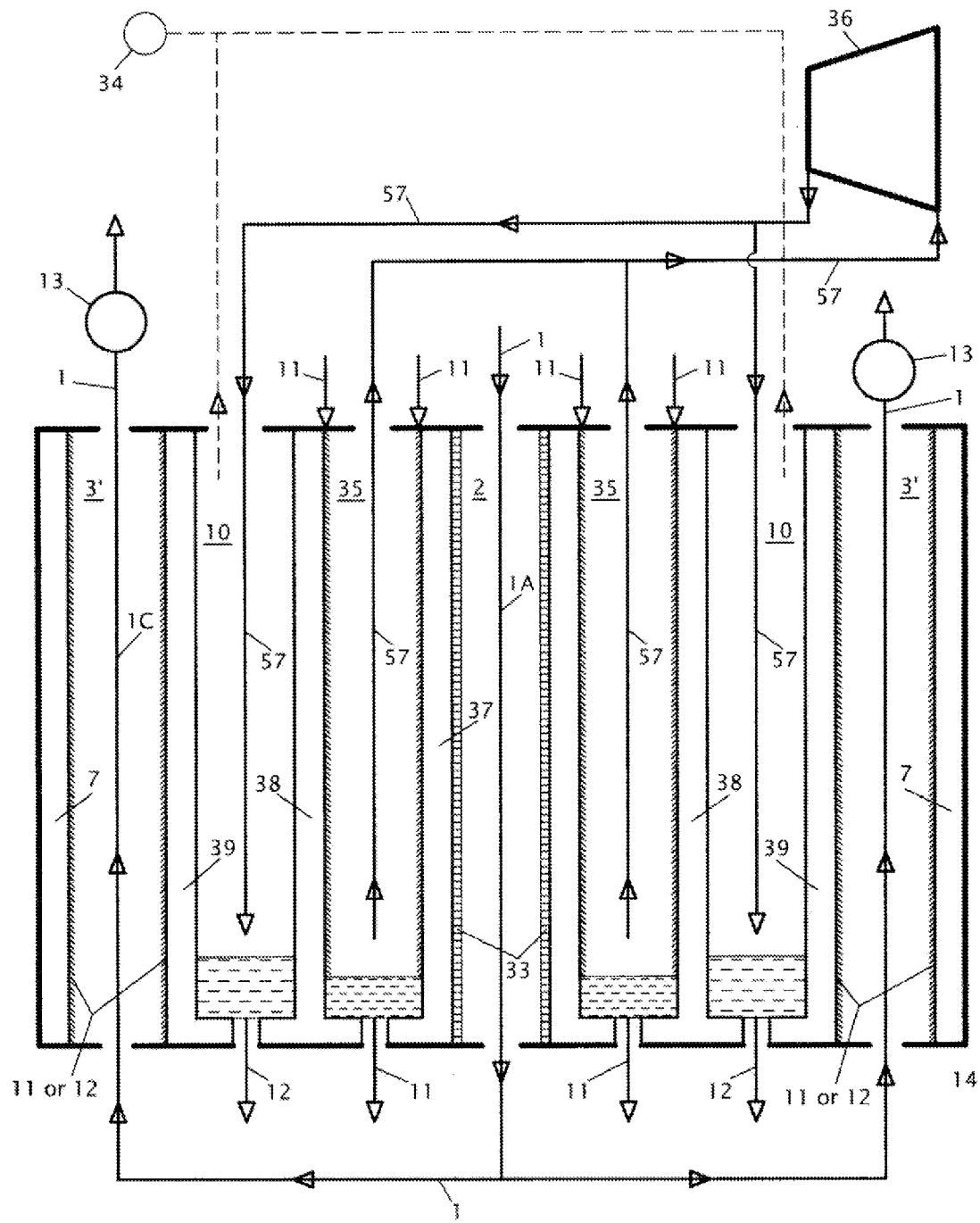
FIG. 9 is a schematic representation of a water distillation system similar to the embodiment of FIG. 8 but utilizing multiple evaporative, condensing and vacuum channels.

FIG. 9 illustrates a variation on FIG. 8, forming an expanded assembly of a single cooling channel 2 with dual evaporative channels 3, condensing channels 10 and vacuum channels 35, disposed within vessel 14. The surface of cooling channel 2 may be covered by solid desiccant material 33 as shown on FIG. 3. The drying process inside cooling channel 2 then reduces the absolute humidity (the moisture content) of airflow 1A and thus increases the latent heat potential capacity and enhances the evaporation of solution 11 (or distilled water 12) in evaporative channels 3'.

As an alternative, vacuum channels 35 and condensing channels 10 may be spaced apart. These channels are connected through a compressor 36 with each other but they are not in heat exchange relation with each other. In one such embodiment, vacuum channels 35 are placed between cooling channels 2, and condensing channels 10 are placed between evaporative channels 3'. This can be useful when outside airflow 1 has low humidity or when reduced energy consumption for compressor 36 is desired.

Note that in embodiments where vacuum channel 35 is in heat exchange relation with cooling channel 2, airflow 1A is both cooled and dehumidified. Because the temperature of the chilled liquid in vacuum channel 35 is less than the dew point temperature of airflow 1A, airflow 1A, after passing through cooling channel 2, has reduced its moisture content. The reduced moisture content helps to evaporate more water from liquid to airflow 1C in evaporative channel 3' and reject more heat from condensing channel 10. As a result it is possible to reduce the temperature in condensing channel 10 and get more cooling capacity or more distilled water. In connection with this, reducing the temperature in condensing channel 10 brings a reduction of pressure inside of condensing channel 10. As a result this, the ratio of pressures for compressor 36 is less and its energy consumption is reduced.

Figure 10:
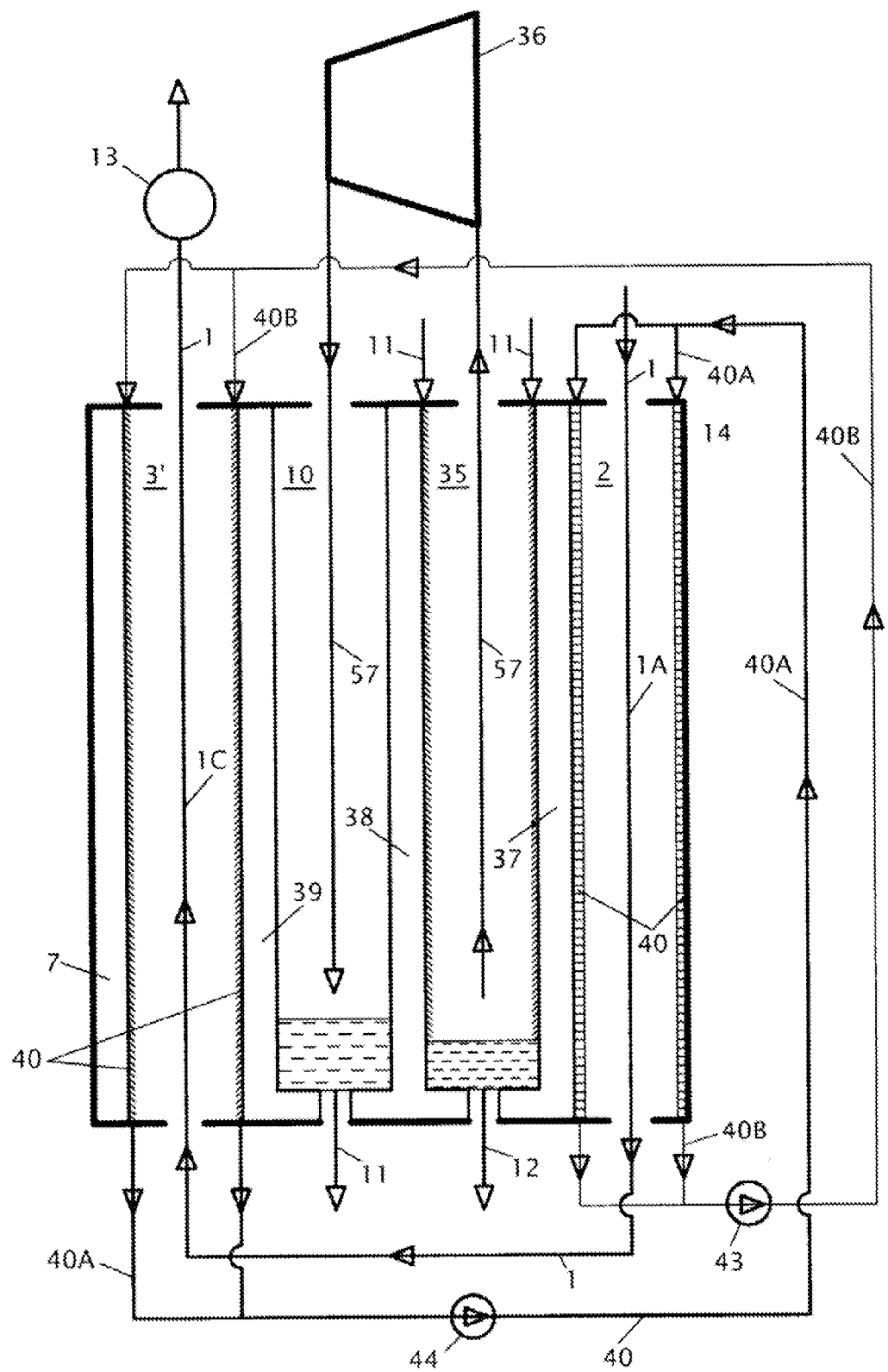
FIG. 10 is a schematic diagram showing a water distillation system similar to that of FIG. 8, but where cooled liquid desiccant is concentrated in the evaporative channel.

FIG. 10 illustrates an embodiment of the present invention wherein liquid desiccant 40 flows into both cooling channel 2 (as strong desiccant 40A) and evaporative channel 3' (as weak desiccant 40B). Airflow 1A is directed through cooling channel 2 in contact with initially strong liquid desiccant 40A. As desiccant 40 dries airflow 1A, the heat of absorption is transferred via plate 37 to vacuum channel 35. Airflow 1A is cooled and its moisture content is reduced. Desiccant 40 is weakened. Desiccant 40 exits cooling channel 2 as weak desiccant 40B and is directed to evaporation channel 3' by pump 43.

Then airflow 1C passes through evaporative channel 3'. Weak desiccant 40B flows into and down evaporative channel 3' in the opposite direction from airflow 1C. Desiccant 40 increases the temperature and moisture of airflow 1C. Desiccant 40 dries out and exits evaporation channel 3 as strong desiccant 40A. Strong desiccant 40A is then directed back to cooling channel 2 by pump 44.

Parameters of the incoming concentrated liquid desiccant 40A to the cooling channel 2 (low temperature and moisture) help to improve the absorption process for airflow 1, reducing its humidity. It helps to evaporate more water from liquid desiccant 40B in the evaporative channel 3' and reject more heat from the condensing channel 10. As a result it is possible to get more distilled water in condensing channel 10.

Figure 11:
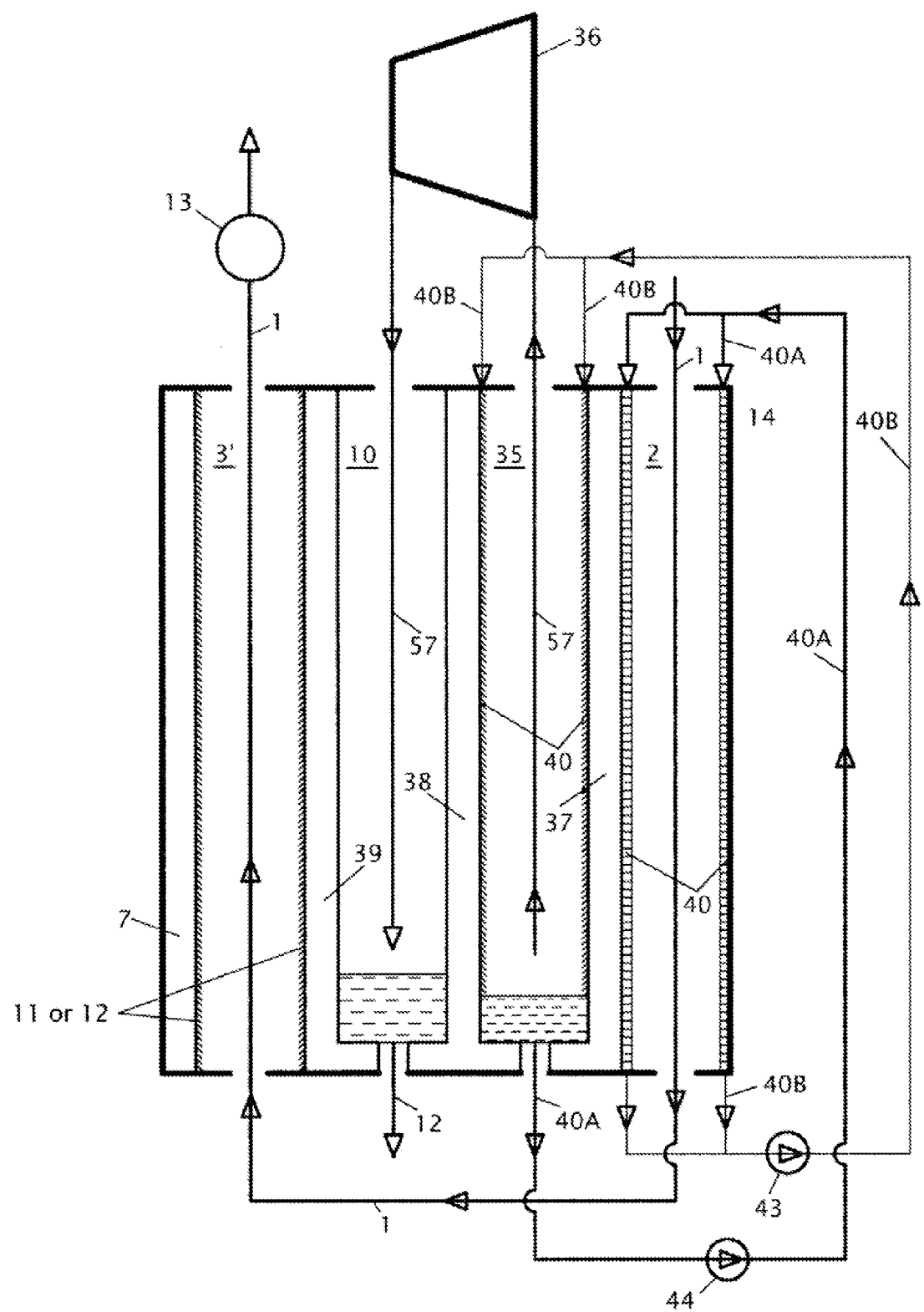
FIG. 11 is a schematic diagram showing a water distillation system similar to that of FIG. 10, but where cooled liquid desiccant is concentrated in the vacuum channel.

FIG. 11 illustrates an embodiment of the present invention wherein liquid desiccant 40 flows along both cooling channel 2 and vacuum channel 35. Strong desiccant 40A is directed by pump 44 from vacuum channel 35 to cooling channel 2. Weak desiccant 40B is directed by pump 43 from cooling channel 2 to vacuum channel 35. Cooled liquid desiccant 40 is concentrated within vacuum channel 35. Concentrated desiccant 40A is used for pre-drying the incoming airflow 1A inside cooling channel 2.

Figure 12:
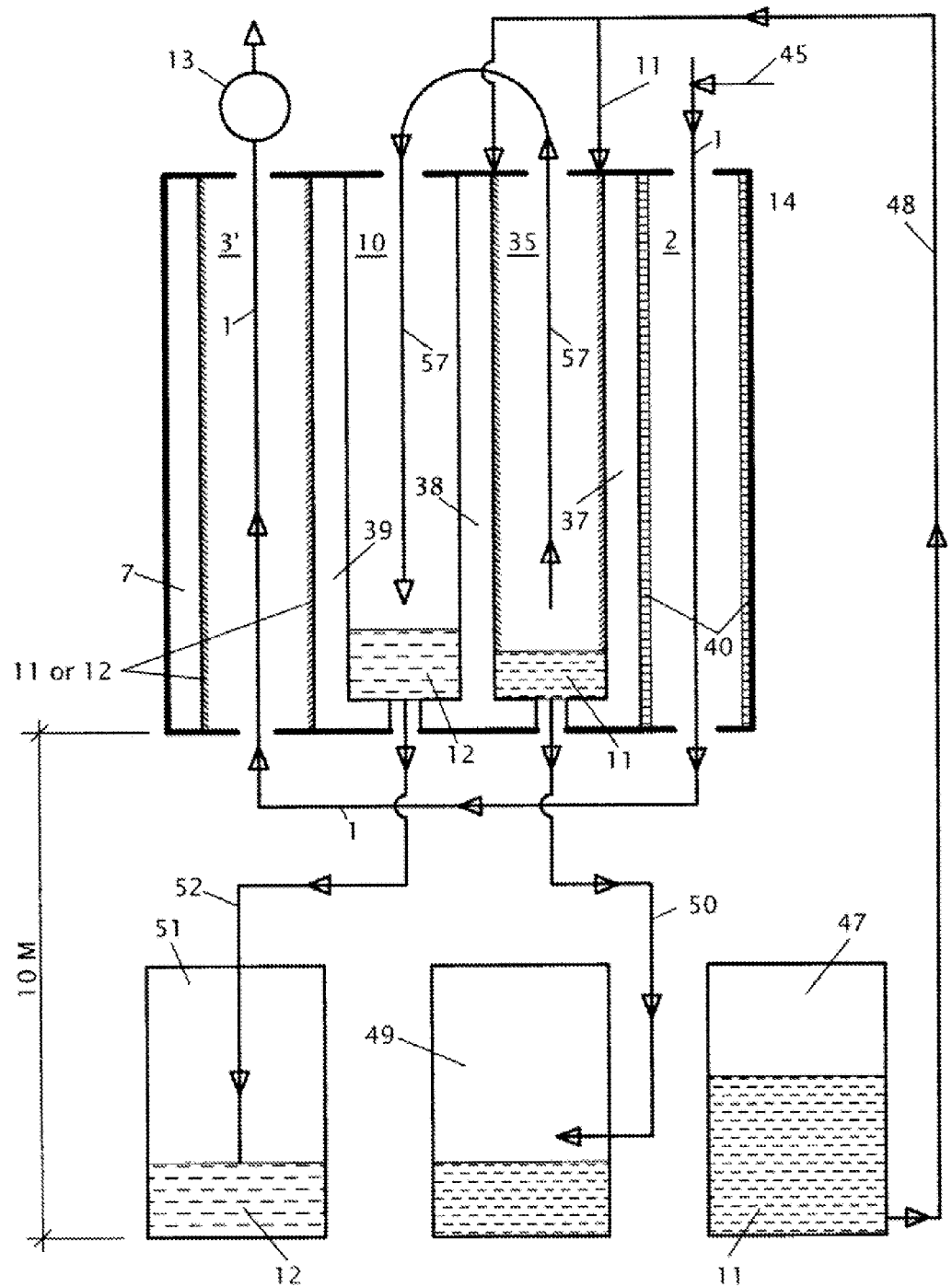
FIG. 12 is a schematic diagram showing a water distillation system similar to those of FIGS. 10 and 11, but which creates vacuum in the vacuum channel without a compressor.

FIG. 12 is a schematic representation of a water distillation system that creates vacuum in vacuum channel 35 without requiring a compressor. This system includes vacuum evaporative channel 35, condensing channel 10, cooling channel 2 and second evaporative channel 3' and is placed at a height of about 10 m above tanks 47, 49, and 51 in order to take advantage of potential energy.

Solution supply tank 47 provides solution 11 to vacuum channel 35 via solution supply pipe 48. Excess solution 11 is drained from vacuum channel 35 via solution discharge pipe 50, for example into a solution discharge tank 49. Distilled water 12 from condensing channel 10 is provided to distilled water tank 51 via distilled water pipe 52.

Balancing the hydrostatic and the atmospheric pressures in solution supply pipe 48 and solution discharge pipe 50 creates a vacuum within vacuum channel 35, without the need for a compressor. Since vacuum channel 35 and condensing channel 10 are connected, water distills from the higher vapor pressure side to the other. The vapor pressure, for example, of seawater is about 1.84% less than that of fresh water over the temperature range of 0-100° C. This means that if vacuum channel 35 (with saline water 11) and condensing channel 10

(with distilled water 12) are connected from the top while maintained at the same temperature, water distills from the fresh waterside to the saline waterside. In order to maintain distillation of water from the saline water 11 (in the vacuum channels 35) to the distilled water 12 (in the condensing channels 10), the vapor pressure of the saline water 11 in vacuum channel 35 must be kept above that of distilled water 12 in the condensing channel 10 by maintaining it at a higher temperature. In known conventional systems this would be achieved by adding heat to the system. The embodiment of FIG. 12 shows the addition of heat 45 to input airflow 1. Heat might be provided, for example, by utilizing solar energy through solar collectors.

The embodiment of FIG. 12 doesn't require additional heat, as it can work efficiently without it. This is because the necessary heat is rejected (via plate 37) from airflow 1, during its passage through cooling channel 2, and simultaneously (via plate 38) from condensing channel 10 to vacuum channel 35. These heat rejection processes cause the vapor pressure of the solution 11 in vacuum channel 35 to be higher than that of the distilled water 12 in condensing channel 10. Those skilled in the art of distillation will appreciate that many variations on the example embodiments discussed above fall within the spirit of the present invention. For example, natural forces (gravity and atmospheric pressure) may be used to create a vacuum in the vacuum channel 35. This idea has the advantages of vacuum distillation without requiring additional energy for compressor to create the vacuum.

The proposed invention improved this known distillation system and enhance of the processes of evaporation and condensation by exploiting simultaneously as source of energy from atmospheric air and as natural barometric pressure.

Another variation is to precool the input airflow 1, using an aircooler or the like. This air cooler may be placed in the airflow path before and/or after condensing channel 10.

The proposed distillation method of the present invention can also be used to provide simultaneously cooling, chemical concentration and volume reduction. Chemical concentration processes are exemplified in the manufacture of chemical concentrates, precipitates and salts. For example, food industries in which solutions are concentrated and reduced in volume by means of evaporative processes are common. For example, seawater or other solutions are evaporated and concentrated to precipitate sea salt for industrial, food, and pharmaceutical applications. This is possible because solution 11 becomes more concentrated as vapor is evaporated from the solution in evaporative channel 3.'

What is claimed is:

1. Apparatus for distilling an input fluid to form a distilled output fluid comprising:
    a vessel;
    a first heat transfer plate arranged within the vessel to form a cooling channel between the first plate and the vessel;
    a second heat transfer plate arranged within the vessel to form an evaporative channel between the first plate and the second plate;
    structure for forming a condensing channel between a heat transfer plate and the vessel;
    an opening in the vessel placed for introducing input air into the cooling channel,
    an opening in the vessel placed to allow output air to pass out of the vessel;
    wetting structure for applying the input fluid to the walls of the heat transfer plates facing into the evaporative channel;
    vapor transfer structure for transferring vapor evaporated from the input fluid within evaporative channel into the condensing channel; and
    output fluid structure for flowing output fluid from the condensing channel.

2. The apparatus of claim 1 further comprising:
    an opening structured to allow air to flow from the cooling channel into the evaporative channel; and
    an opening structured to allow air to flow from the evaporative channel to the condensing channel.

3. The apparatus of claim 2 wherein the opening comprises at least one aperture formed in the first heat transfer plate.

4. The apparatus of claim 2 wherein the opening comprises a gap between the first heat transfer plate and the vessel and wherein the wetting structure includes a wicking layer formed on the walls of the heat transfer plates facing into the evaporative channel.

5. The apparatus of claim 2 wherein the vapor structure includes a fan.

6. The apparatus of claim 2, wherein the output fluid structure includes a pipeline configured to stream output fluid adjacent to vapor transferred between the evaporation channel and the condensing channel in order to cool vapor.

7. The apparatus of claim 2 wherein the wetting structure further includes a reservoir configured to collect flowed input fluid that has flowed along the walls of the heat transfer plates facing into the evaporative channel, and further including a pipeline configured to stream the flowed input fluid adjacent to vapor transferred between the evaporation channel and the condensing channel in order to cool vapor.

8. The apparatus of claim 2 further including desiccant structure configured to dry input air.

9. The apparatus of claim 2 further comprising multiple sets of cooling channels, evaporative channels, and condensing channels wherein each evaporative channel is located between a cooling channel and a condensing channel.

10. The apparatus of claim 2 wherein the condensing channel is formed between the second heat transfer plate and the vessel.

11. The apparatus of claim 2 wherein the condensing channel is formed between the first heat transfer plate and the vessel and further including separation structure for isolating the cooling channel from the condensing channel.

12. The apparatus of claim 1 wherein:
    the evaporative channel forms a vacuum chamber and the condensing channel forms a compression chamber.

13. The apparatus of claim further comprising a second evaporative channel adjacent to the condensing channel, and structure for providing air from the cooling channel to the second evaporative channel.

14. The apparatus of claim 13 wherein the vapor structure comprises a compressor.

15. The apparatus of claim 13 wherein the vapor structure comprises an input fluid supply pipe connecting an input fluid supply and the evaporative vacuum channel, and an excess fluid discharge pipe connecting the evaporative channel and an excess fluid discharge; and
    wherein the input fluid supply, excess fluid discharge and the pipes are constructed and arranged below the vacuum channel to apply a vacuum to the vacuum channel via gravity.

16. The apparatus of claim 12 further comprising multiple sets of cooling channels, evaporative channels, and condensing channels.

17. The apparatus of claim 13 further comprising multiple sets of cooling channels, evaporative channels, condensing channels, and second evaporative channels.

18. The apparatus of claim 13 further including desiccant structure configured to flow a liquid desiccant first through the cooling channel and then through the second evaporative channel.

19. The apparatus of claim 13 further including desiccant structure configured to flow a liquid desiccant first through the vacuum channel and then through the cooling channel.

* * * * *